United States Patent
Marom (10) Patent No.: US 7,623,790 B2
(45) Date of Patent: Nov. 24, 2009

(54) SIGNAL IDENTIFICATION METHOD

(75) Inventor: Dan Mark Marom, Howell, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 597 days.

(21) Appl. No.: 11/233,587

(22) Filed: Sep. 24, 2005

(65) Prior Publication Data

US 2007/0071441 A1 Mar. 29, 2007

(51) Int. Cl.
H04B 10/06 (2006.01)
(52) U.S. Cl. .......................... 398/94; 398/95; 398/202; 398/209
(58) Field of Classification Search ................... 398/94, 398/95, 202, 209
See application file for complete search history.

(56) References Cited

U.S. PATENT DOCUMENTS

| | | | | |
|---|---|---|---|---|
| 5,949,560 A * | 9/1999 | Roberts et al. | ................ | 398/29 |
| 6,469,814 B1 * | 10/2002 | Park et al. | ...................... | 398/79 |
| 6,654,411 B1 * | 11/2003 | Roberts et al. | .............. | 375/225 |
| 6,704,512 B1 * | 3/2004 | Jung | .......................... | 398/87 |
| 6,714,741 B1 * | 3/2004 | Van De Bergh et al. | ........ | 398/34 |
| 6,952,529 B1 * | 10/2005 | Mittal | .......................... | 398/26 |
| 7,221,869 B1 * | 5/2007 | Burford et al. | ................ | 398/25 |
| 7,413,893 B2 * | 8/2008 | Schermer et al. | ......... | 435/287.2 |
| 2003/0063854 A1 * | 4/2003 | Barwicz et al. | ............... | 385/37 |

OTHER PUBLICATIONS

Anthony, Tamara Lynn. "8. Least Squares Approximation". Sep. 14, 2000. viewed on Aug. 2, 2008 <http://ceee.rice.edu/Books/LA/leastsq/>.*
Weik, Martin H. "curve-fitting compaction", "data compaction", "dense wavelength division multiplexing". Fiber Optics Standard Dictionary. 3rd ed. 1997.*
WES. "Curve fitting and the method of least squares". Jul. 3, 1997, updated Jan. 2, 2002 by JMT. viewed on Aug. 2, 2008 <http://pages.pomona.edu/~wes04747/1ab/least_sq.doc>.*
Weik, Martin H. "optical spectrum analyzer", "parallel operation", "spectral composition". Fiber Optics Standard Dictionary. 3rd ed. 1997.*

* cited by examiner

*Primary Examiner*—Leslie Pascal
(74) *Attorney, Agent, or Firm*—Brosemer, Kolefas & Associates, LLC (57) ABSTRACT

A signal identification method for efficiently identifying Dense Wavelength Division Multiplexing (DWDM) channel modulation formats, signal powers, and center frequency detuning of signals that may be used in conjunction with telecom-grade monitoring equipment. The method utilizes least-square curve fitting estimates applied to a set of curves, each curve is characteristic of a modulation format and rate. For each least-square estimate an error value is calculated, and a curve fit with the least error is selected as the identified signal format for a signal.

13 Claims, 6 Drawing Sheets

SIGNAL IDENTIFICATION METHOD

TECHNICAL FIELD

The present invention relates generally to signal identification for reliably estimating dense wavelength division multiplexing (DWDM) channel modulation formats, signal powers, and center frequency detuning. The present invention relates more particularly, to application of least-squares curve fitting to the sampling data from optical monitoring equipment for determining (DWDM) channel modulation formats, signal powers, and center frequency detuning.

BACKGROUND

Optical communication systems often use wavelength-division multiplexing (WDM) or dense wavelength-division multiplexing (DWDM) to transmit information in an optical fiber. Such techniques often involve packing voluminous amounts of information into signals and transmitting the signals simultaneously over the same fiber. Each signal is uniquely propagated on a different center frequency in the fiber so it can be recognized when received at a receiving end of a transmission system.

Today, optical equipment manufacturers are challenged with making more efficient use of installed fiber to increase available bandwidth while reducing the cost of deployment. Passive optical components, such as optical monitoring equipment, are commonly used to meet this challenge. The optical monitoring equipment is used to monitor performance of each signal transmitted in a fiber, to ascertain impediments such as power transients and loss of signals.

Unfortunately, the resolution demands necessary to identify signal characteristics are usually beyond the capabilities of telecom-grade monitoring equipment positioned between the ingress and egress points in an optical path. As a result it is often necessary to identify signals and their respective attributes by inference, which may be further encumbered by noise sources, large channel power ranges, and center-frequency misalignment. Accordingly, it is difficult to efficiently and reliably identify signals transmitted in a fiber optic system using telecom-grade monitoring equipment today.

SUMMARY

To address the above-discussed deficiencies associated with telecom-grade monitoring equipment used today, the present invention provides a signal identification method for efficiently identifying Dense Wavelength Division Multiplexing (DWDM) channel modulation formats, signal powers, and center frequency detuning (or frequency shift or offset) of signals that may be used in conjunction with telecom-grade monitoring equipment. The method may utilize least-squares curve-fitting estimates applied to a set of predetermined curves, each of the predetermined curves being characteristic of, for example, a modulation format and/or data rate. For each least-squares estimate an error value is calculated, and a curve-fit with the least error is selected as the identified signal format for a signal.

For example, data samples from an optical signal are received and compared to a set of pre-stored continuous model curves representing different modulation formats. For each comparison, an error value is calculated representing a quantity of difference between the data sample and each of the pre-stored model curve shapes. A particular one of the pre-stored model curve shapes corresponding to the error value having the least quantity of difference is chosen thereby providing a determination of the modulation format for the received optical signal.

To account for center frequency detuning from the ITU grid, the least-squares curve-fit process may be used to determine the best match between the sampled optical signal and one of a set of frequency shifted function forms. The curve-fit process may be performed several times, each time with a function form with small discrete frequency shift from nominal to the function form, or the curve-fit operations may be performed in parallel when the appropriate computational resources are provided. Alternatively, a portion of the curve fit operations may be performed in parallel, so that several parallel, or batch, operations are performed to complete the analysis. In this way, a designer may choose the desired trade-off between computational resources and analysis speed. The least-squares estimate with the smallest error value will therefore indirectly indicate an amount of detuning by matching the received data sample to a model curve, i.e., function form, with a known detuning from nominal.

Accordingly, the signal identification method described herein is reliable and robust, providing information not only on the predicted signal in each channel, but also on the channel center location. Additionally, methods in accordance with the present invention provide a reliable estimate of channel powers.

Further features and advantages of the present invention may become apparent after reading the Detailed Description section in conjunction with the drawings.

BRIEF DESCRIPTION OF THE DRAWINGS

The detailed description is presented with reference to the accompanying figures. In the figures, the left-most digit(s) of a reference number identifies the figure in which the reference number first appears. Reference is now made to the following descriptions taken in conjunction with the accompanying drawings, in which.

DETAILED DESCRIPTION

Generally, incoming optical signals on a fiber are analyzed by the intensity at discrete frequencies, and power spectrum samples are obtained. The sampled power spectra are compared to previously prepared sets of power spectrum curves wherein those sets of previously prepared power spectrum curves are designed to represent specific characteristics of expected incoming optical signals. Curve-fitting techniques are applied between the sampled optical signal and the prepared curves, to determine best fits. In turn, this best-fit matching provides information about the sampled signal such as, but not limited to, modulation format, data rate, deterioration of power level, and detuning (i.e., frequency shift from nominal). Inferring information about incoming optical signals in this way advantageously provides for determination of signal characteristics that are beyond the resolution of the equipment used to sample the optical signal.

It is noted that each of the data samples referred to herein typically includes a plurality of data points for each signal. The number of data points in a sample can be chosen so as to provide the desired trade-off between the resolution and the complexity and cost of the equipment used to obtain the data samples.

Reference herein to "one embodiment", "an embodiment", or similar formulations, means that a particular feature, structure, operation, or characteristic described in connection with the embodiment, is included in at least one embodiment of the present invention. Thus, the appearances of such phrases or formulations herein are not necessarily all referring to the same embodiment. Furthermore, various particular features, structures, operations, or characteristics may be combined in any suitable manner in one or more embodiments.

Optical monitoring equipment deployed in today's optical communication systems is used to ascertain the impact to system performance from impediments such as power transients and loss of signals. As mesh optical networks proliferate, utilizing reconfigurable optical add-drop multiplexers (ROADM) for optical path switching, more information needs to be inferred by the optical monitoring equipment since signals may be combined from different sources and have disparate data rates, modulation formats, and power levels.

Methods in accordance with the present invention, obtain information from a telecom-grade optical spectrum analyzer (OSA) (or another suitable measurement device), which is typically in the form of the DWDM channel power spectra, perform various computational operations to provide output information in connection with distinguishing between, for example, 10 Gb/s and 40 Gb/s modulation formats (or the absence of a signal). Embodiments of the present invention may further provide an estimate of the center frequency detuning from the ITU grid.

The field of signal identification in a noisy environment has been studied extensively for other disciplines. However, the signal identification task faced by embodiments of the present invention is encumbered not only by noise sources (e.g., detection noise and optical signal-to-noise ratio (OSNR)), but also by finite OSA resolution, typically 0.15 nm resolution in telecom-grade OSA. Such resolution implies that certain identification tasks are beyond the capabilities of the OSA resolution. For example, a CW laser and a 10 Gb/s signal (in any modulation format) appear the same at 0.15 nm. Higher resolution OSAs, such as laboratory-grade instruments with resolution bandwidths of 0.01 nm or better, may be applied to distinguish among 10 Gb/s modulation formats and other finer features by matching the identification algorithm to the employed instrument.

In various embodiments of the present invention, the technique for the identification process is a least-squares curve fitting estimate to a set of previously prepared curves. Each of the previously prepared curves being characteristic of at least one signal characteristic such as, but not limited to, a modulation format, center frequency detuning, and data rate. For each least-squares estimate, an error value is determined, and the characteristics associated with the prepared curve to which the sampled data fits with least error are selected as the identified signal modulation format and data rate.

The least-squares estimate is known to be equivalent to the classical maximum-likelihood estimate in the presence of additive white Gaussian noise (AWGN). The AWGN model is not an accurate descriptor of the noise source for embodiments of the present invention since the OSA detects the power spectrum. However, the lease-squares estimate still provides very reasonable results, especially at higher OSNR (in which case it will converge to the maximum-likelihood estimate).

To account for center frequency detuning from the ITU grid, the least-squares estimate for each characteristic functional form is performed several times with small discrete frequency shifts to the functional form applied at each time. The least-squares estimate with the smallest error value will therefore also contain information on the amount of detuning. Since the OSA's coarse sampling data is curve-fit to a continuous functional form, the small discrete frequency shifts can be much smaller than the resolution bandwidth of the OSA, and therefore embodiments of the present invention can provide fine detuning (i.e., frequency shift) information (see FIG. 1).

Figure 1:
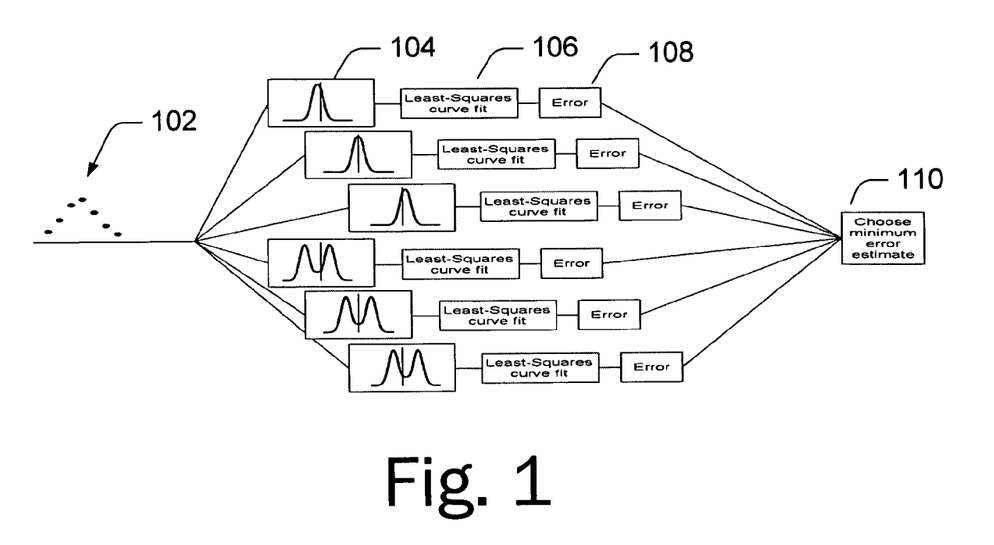
FIG. 1 illustrates a least-squares curve fit process for signal characteristic identification in accordance with the invention.

In particular, FIG. 1 illustrates a process for identifying various characteristics of a signal. A data sample 102 is obtained from an optical monitoring device. The data sample typically includes a few power spectrum readings of the signal that fall within the bandwidth of a particular DWDM channel. The data sample 102 is compared to set of pre-stored model curves 104 representing different modulation formats and frequency shifts from nominal. In blocks 106, a least-squares curve fit analysis is used to compare the data sample 102 to the set of pre-stored model curves (blocks 104). For each comparison, an error value (blocks 108) representing a quantity of difference between the data sample and a particular one of the pre-stored model curves, as well as additional fit parameters, is determined. Finally, in block 110 the smallest of the plurality error values (a particular one of blocks 108) is determined, along with various additional decision criteria related to fit parameters. In the illustrative embodiment of FIG. 1, a modulation format and frequency shift for the optical signal is estimated based on a modulation format and frequency shift associated with the selected pre-stored model curves.

Figure 2:
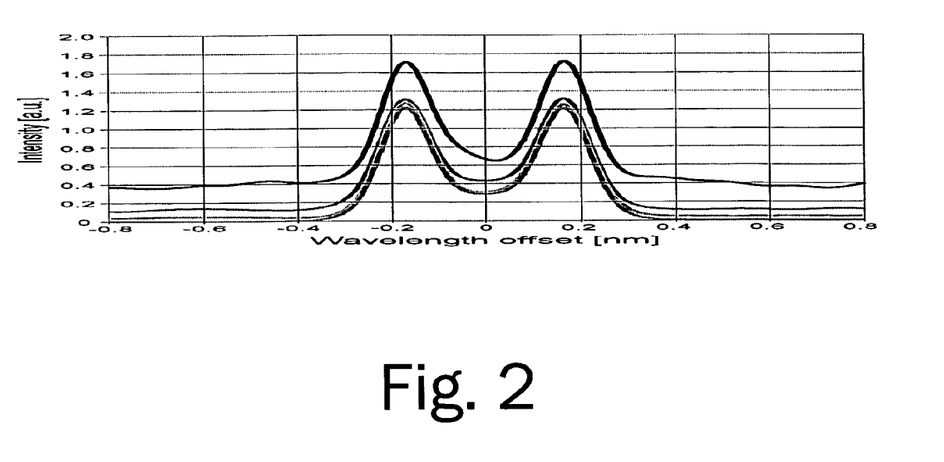
FIGS. 2-3 show, respectively, optical power spectra for a simulated 40 Gb/s CSRZ power spectra at various OSNR, and an analytical model of the same.
Figure 3:
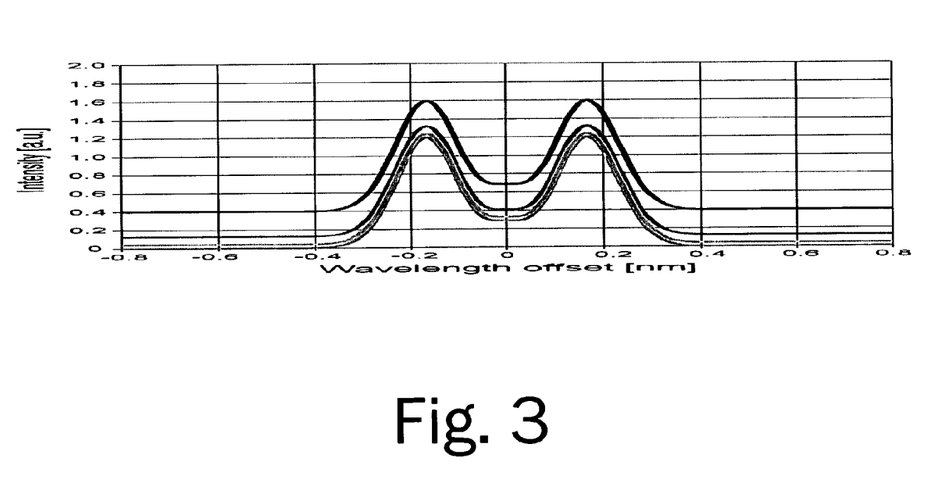

The functional forms that are used to approximate the shape of the signals' power spectra were obtained by modeling the transported optical signals. For each data rate and modulation format, a random signal sequence was generated and numerically propagated through fiber to generate some linear and nonlinear distortions. Different levels of AWGN were injected, and for each case a power spectrum was generated and convolved with a Gaussian function to simulate the OSA resolution (FIG. 2, for 40 Gb/s CSRZ). An analytic approximating function was created for each case, whose functional form closely resembles the curves obtained by the modeling. The 40 Gb/s CSRZ signal was approximated by the sum of three Gaussians and a constant term for the noise level (FIG. 3). For 10 Gb/s signals, the model utilized a single Gaussian function, which models the OSA resolution and not the signal form which is lost, and an additive constant term for the noise level. Although the illustrative embodiments show two particular waveforms, it is appreciated that a wide variety of modulation formats could be determined such as RZ, NRZ, etc.

Figure 4:
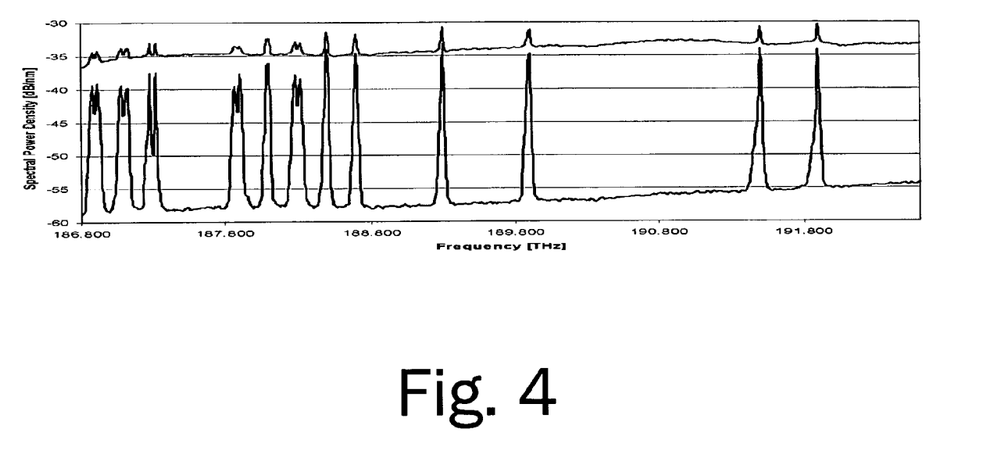
FIG. 4 shows data to be analyzed consists of a mix of 10 Gb/s RZ and 40 Gb/s CSRZ, as collected from an optical monitoring device.

The signal identification process was applied to sampling data collected from a telecom-grade OSA. The introduced optical signals were either 10 Gb/s RZ, or 40 Gb/s CSRZ (or no signal on some DWDM channels), combined with emission from an erbium-doped amplifier for varying the OSNR on the collected traces (FIG. 4). The signal identification process first parses the data into samples that fall into each DWDM channel bin. For each DWDM channel, the data samples are curve fit to the set of predefined functional forms by the least-squares procedure. The functional forms are also shifted by −6, −4, −2, 0 2, 4, and 6 GHz, to identify center frequency misalignments.

Figure 5:
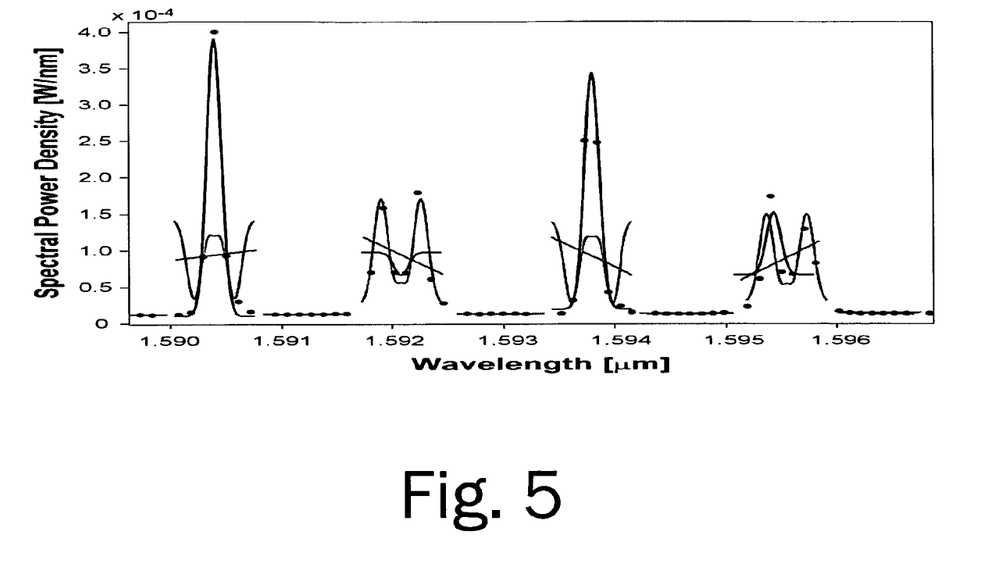
FIG. 5 shows least-squares curve-fitting, and best-fit line-matching, to the data samples.

In various embodiments of the present invention, best fit to a line is also performed for comparison purposes in the decision making process (as this aids in identifying cases with no telecom signal presence). FIG. 5 plots the best-fit curves for the 10 Gb/s RZ, 40 Gb/s CSRZ cases, and the line fit to the data samples for a few channels in the spectrum. One can visually discern how the curves attempt to best-fit in the least-squares sense; the 10 Gb/s waveforms (Gaussian curve) fitting very well to their samples on a match and exhibiting a large offset or a negative amplitude in order to fit the 40 Gb/s samples. The 40 Gb/s CSRZ curves (double peaked waveform) also fitting well on a match and exhibiting a negative amplitude to fit the 10 Gb/s samples. Using the least-squares error metric, the methods in accordance with the present invention easily distinguish between the two signal formats (least-squares fits in Table 1).

TABLE 1

| Ch | Iden | 10 Gb/s | 40 Gb/s | Linear |
|----|------|---------|---------|--------|
| 44 | 10   | 0.0095 | 0.6078 | 0.6539 |
| 45 | —    | 0.0010 | 0.0007 | 0.0001 |
| 46 | 40   | 0.2345 | 0.0157 | 0.2229 |
| 47 | —    | 0.0004 | 0.0001 | 0.0004 |
| 48 | 10   | 0.0108 | 0.4864 | 0.5541 |
| 49 | —    | 0.0007 | 0.0007 | 0.0009 |
| 50 | 40   | 0.1386 | 0.0538 | 0.1967 |

Table 1 shows the least-squares errors normalized by the energy of the data samples for the channels shown in FIG. 4. The first and second columns respectively list the channel numbers and the corresponding signal attributes, or characteristics which may be assigned to the sampled incoming optical signal based on a best-fit to a particular predetermined curve. The third, fourth and fifth columns list the normalized errors for the 10 Gb/s, 40 Gb/s, and linear fit cases. It can be seen that the numbers presented in bold face in Table 1 represent distinct minimum errors, and are therefore used as the basis for properly identifying the 10 Gb/s and 40 Gb/s channels.

In the cases where there is no signal present in the DWDM channel being tested, one finds that the errors for the 10 Gb/s, 40 Gb/s, and line fits are all very close to each other and all exhibit very low normalized fit errors (Table 1). The reason for the low errors is that the noise is quite constant and all curve fits have a constant component variable that dominates in these cases (the amplitude of the functional form approaches zero). One can establish this fact as a basis for determining that no signal is present.

Embodiments of the present invention were tested in a variety of scenarios, differing in power levels, OSNR, relative power levels in different channels, and were proven to be very reliable and robust. Embodiments of the present invention provide information not only on the predicted signal in each channel, but also on the channel center location. Additionally, various embodiments of the present invention provide more reliable estimates of the channel power density over the continuous best-fit curve as opposed to the OSA's discrete coarse sample. Finally, this technique may be useful to provide a measure of the OSNR, based on the ratio of the amplitude coefficient and the DC bias term. Factory calibration for the OSNR values need to be performed, to take into account the detector dark current and other noise sources.

Computationally, the algorithm is very efficient, as only two parameters need to be evaluated for each fit (amplitude multiplier for the functional form and additive constant term), requiring the trivial inversion of a 2×2 matrix. The algorithm can be further expanded to identify other modulation formats that have resolvable and distinct power spectrum signatures.

Figure 6:
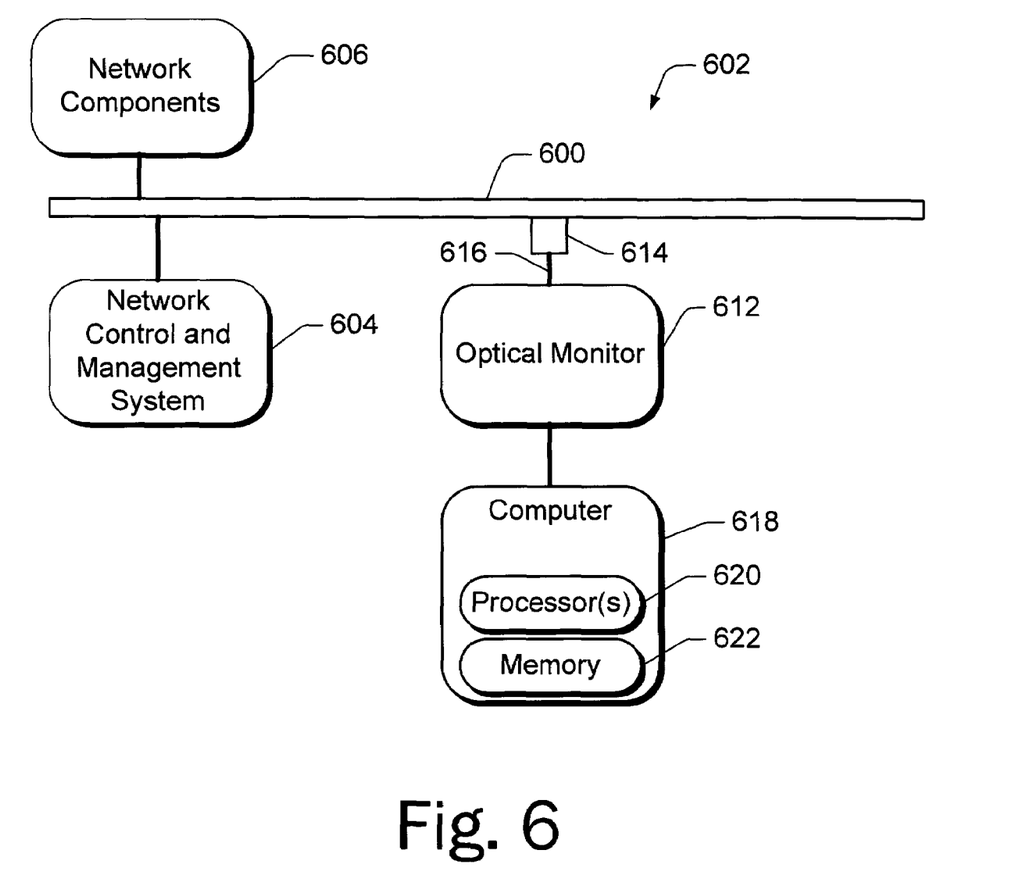
FIG. 6 shows an illustrative fiber-optic communications link in an optical communications network.

FIG. 6 shows an illustrative fiber-optic communications link 600 in an optical communications network 602. The fiber-optic communications link 600 may be used to support wavelength division multiplexing arrangements in which multiple communications channels are provided each using different wavelengths of light.

A network control and management system 604 may be implemented on suitable network computer equipment. Network components 606 such as amplifiers, transmitters, receivers, and other modules may have control units that communicate with the network control and management system. For example, the network control and management system 604 may send commands to a control unit (not shown) in an amplifier (not shown) that directs the amplifier to establish a particular gain setting or output power setting. Of course, other illustrative equipment may be provided and communicate with network control and management system 604.

An optical monitor 612 (e.g., an optical detector, optical spectrum analyzer, optical channel monitor, or other suitable optical monitoring equipment) may be used to monitor optical signals in link 600. Optical signals in link 600 may be tapped at any suitable location or locations in link 600 using one or more optical taps such as tap 614. Such taps may be, for example, wavelength-insensitive taps that tap a relatively small fraction (e.g., 1%) of the optical power from the fiber path on which the optical signals on link 600 are traveling.

Tapped optical signals from tap 614 may be provided to optical monitor 612 over a fiber path 616. A computer 618 may communicate with optical monitor 612 over one or more communication paths 616. The innovative method described herein may be implemented as computer-executable code executing on one or more processors 620 operating in computer 618. The computer-executable code may be accessed from any local or remote memory 622 such as volatile or non-volatile memory. Also stored in memory 622 are pre-stored model curve shapes (see blocks 104 of FIG. 1) representing different modulation formats used by a least-square curve fit portion method. Although computer 618 is shown as being a separate unit from optical monitor 612, it is possible for optical monitor 612 and computer 618 to be a single integrated device.

Figure 7:
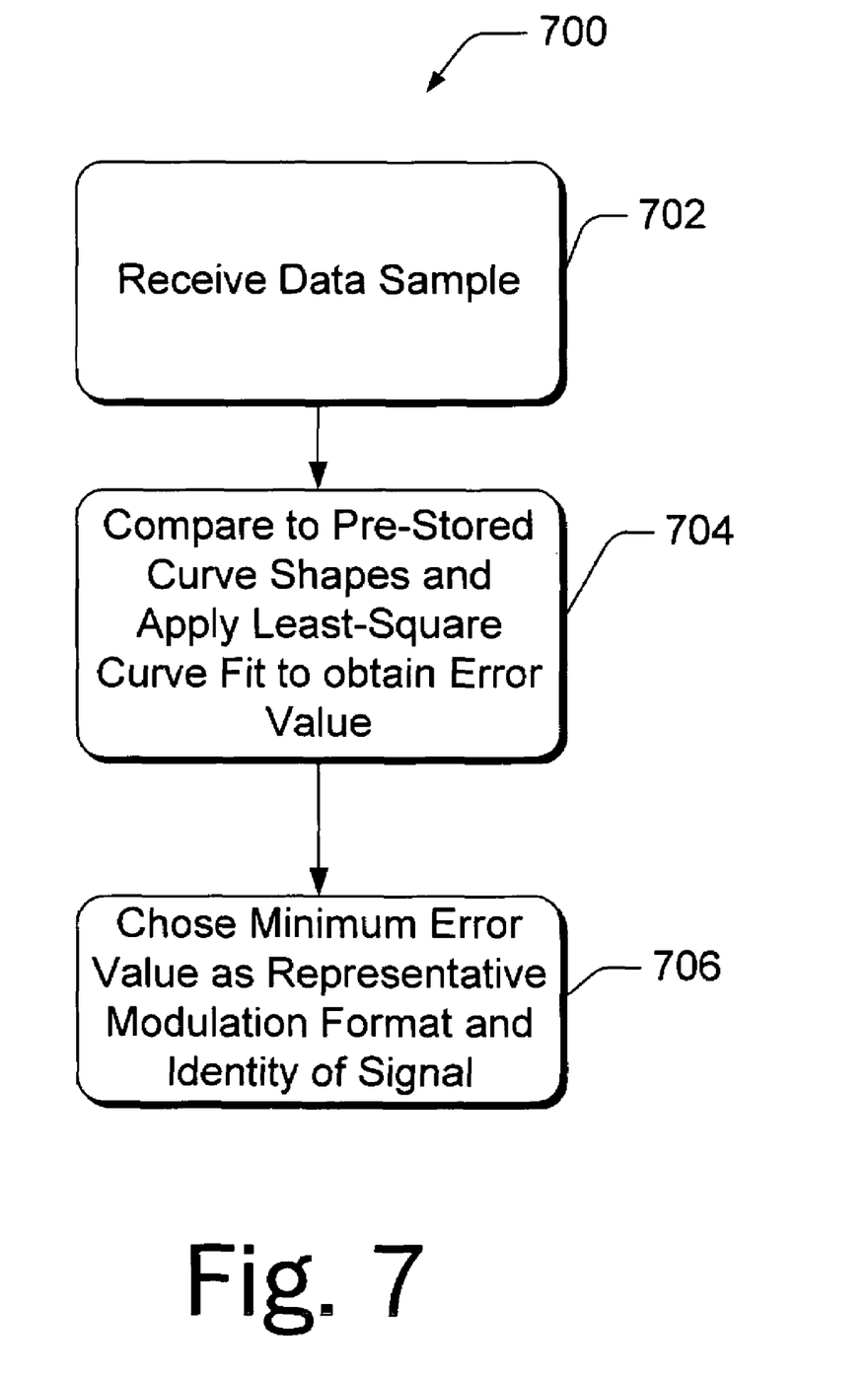
FIG. 7 illustrates a method for identifying characteristics of an optical signal.

FIG. 7 illustrates a method 700 identifying characteristics of an optical signal. Method 700 includes blocks 702, 704, and 706. The order in which the method is described is not intended to be construed as a limitation. Furthermore, the method can be implemented in any suitable hardware, software, firmware, or combination thereof.

In block 702, a data sample representing an optical signal is received. For example, tapped optical signals from tap 614 (FIG. 6) may be provided to optical monitor 612 (FIG. 6). Optical monitor 612 and/or computer 618 (FIG. 6) convert the optical signal into a data sample so that it may be processed.

In block 704, the data sample is compared to a set of pre-stored model curve shapes representing different modulation formats. For each comparison, a least-squares curve fit analysis is applied to arrive at an error value representing a quantity of difference between the data sample and a particular one of the pre-stored model curve shapes as well as the amplitude and constant additive terms of the fit.

It will be appreciated by those skilled in this field and having the benefit of the present disclosure, that the curve-fit process includes, as indicated in the preceding paragraph, in addition to the model function forms, determinations with respect to parameters such as, but not necessarily limited to, amplitude coefficients and DC offsets. The present invention is not limited to any particular curve-fitting process or parameter set.

In block 706, one of the pre-stored model curve shapes with an error value having a least quantity of difference is selected. The modulation format for the optical signal is identified based on the modulation format associated with the selected one of the pre-stored model curve shapes determined in block 706.

The embodiments described herein are to be considered in all respects only as exemplary and not restrictive. The scope of the invention is, therefore, indicated by the subjoined Claims rather by the foregoing description. All changes which come within the meaning and range of equivalency of the Claims are to be embraced within their scope.

What is claimed is:

1. A method for identifying characteristics of an optical signal, comprising:
    receiving a data sample representing a first optical signal; said receiving step comprising the steps of:
        providing an optical fiber having an amount of optical power therein; tapping off a fraction of the optical power present in the optical fiber; obtaining an optical power spectrum; and parsing the optical power spectrum into a plurality of data samples associated with particular channels of a wavelength division multiplexing communication system; wherein each of the data samples comprises a plurality of data points; and wherein obtaining the optical power spectrum is limited to a first resolution by the characteristics of an optical spectrum analyzer, and wherein at least one signal characteristic attributed to the first optical signal has a resolution finer than the first resolution;
    comparing the data sample to a set of pre-stored model curves, each model curve representing at least one signal characteristic using a curve-fit analysis;
    determining, for each comparison, an error value representing a quantity of difference between the data sample and a particular one of the pre-stored model curves;
    selecting one of the pre-stored model curves with an error value having a least quantity of difference;
    attributing to the first optical signal the at least one signal characteristic of the selected one of the pre-stored model curves; and determining center frequency detuning from an ITU grid for the optical signal by performing a least-squares estimate for each characteristic functional form several times with small discrete frequency shifts to the functional form applied each time.

2. The method of claim 1, wherein comparing the data sample to a set of pre-stored model curves comprises comparing the data sample to each of the pre-stored model curves in parallel.

3. The method of claim 1, wherein comparing the data sample to a set of pre-stored model curves comprises comparing the data sample to at least a subset of the pre-stored model curves in parallel.

4. The method of claim 1, further comprising performing a best-fit to a line.

5. The method of claim 1, wherein the data sample comprises a plurality of power spectrum values, and the plurality of power spectrum values fall within the bandwidth of a DWDM channel.

6. The method of claim 1, wherein the curve-fit analysis provides the amplitude multiplier and offset value of the pre-stored model curve.

7. The method of claim 6, wherein the step of determining an error value prior to selecting one of the pre-stored model curves, includes determining an error value that considers the amplitude multiplier and the offset value.

8. The method of claim 6, further comprising obtaining an OSNR value based, at least in part, on the ratio of the amplitude multiplier and the offset value.

9. The method of claim 1, wherein the curve-fit analysis includes frequency shifting of the model curves to measure frequency detuning of the first optical signal.

10. The method of claim 1, wherein the act of comparing the data sample to a set of pre-stored model curves comprises performing a least squares curve-fit between the data sample and a particular one of the pre-stored model curves.

11. The method of claim 1, wherein the pre-stored model curves reside in memory of a computer.

12. The method of claim 1, wherein the method is performed by an optical monitoring device in conjunction with a computer.

13. The method of claim 1, wherein the method is performed by a computer.

* * * * *

UNITED STATES PATENT AND TRADEMARK OFFICE
CERTIFICATE OF CORRECTION

| | |
|---|---|
| PATENT NO. | : 7,623,790 B2 |
| APPLICATION NO. | : 11/233587 |
| DATED | : November 24, 2009 |
| INVENTOR(S) | : Dan Mark Marom |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1023 days.

Signed and Sealed this

Fourteenth Day of December, 2010

David J. Kappos
*Director of the United States Patent and Trademark Office*